(12) United States Patent
Greer et al.

(10) Patent No.: US 7,255,448 B2
(45) Date of Patent: Aug. 14, 2007

(54) PIXELATED COLOR MANAGEMENT DISPLAY

(75) Inventors: Michael Greer, Corvallis, OR (US); David C. Collins, Philomath, OR (US); William J. Allen, Corvallis, OR (US); Timothy F Myers, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 169 days.

(21) Appl. No.: 10/969,412

(22) Filed: Oct. 20, 2004

(65) Prior Publication Data

US 2006/0082560 A1   Apr. 20, 2006

(51) Int. Cl.
G03B 21/14 (2006.01)
G02F 1/1335 (2006.01)

(52) U.S. Cl. ............... 353/84; 353/31; 348/759; 348/742; 349/5; 349/80

(58) Field of Classification Search ............. 353/33, 353/20, 81, 84, 97, 31; 348/742, 756, 757, 348/759; 349/57, 61–64, 8, 9, 5, 80
See application file for complete search history.

(56) References Cited

U.S. PATENT DOCUMENTS

| | | | |
|---|---|---|---|
| 5,868,480 A | 2/1999 | Zeinali | |
| 5,986,740 A * | 11/1999 | Robinson et al. | 349/201 |
| 5,986,815 A * | 11/1999 | Bryars | 359/634 |
| 6,097,456 A | 8/2000 | Wang et al. | |
| 6,276,801 B1 | 8/2001 | Fielding | |
| 6,476,986 B2 * | 11/2002 | Smith et al. | 359/827 |
| 6,570,613 B1 | 5/2003 | Howell | |
| 6,591,022 B2 | 7/2003 | Dewald | |
| 6,624,726 B2 | 9/2003 | Niu et al. | |
| 6,688,748 B2 * | 2/2004 | Lewis et al. | 353/69 |
| 6,739,723 B1 * | 5/2004 | Haven et al. | 353/20 |
| 6,834,963 B2 * | 12/2004 | Kim et al. | 353/31 |
| 2003/0048393 A1 | 3/2003 | Sayag | |
| 2003/0123120 A1 * | 7/2003 | Hewlett et al. | 359/237 |
| 2003/0142241 A1 | 7/2003 | Allen et al. | |
| 2004/0008288 A1 | 1/2004 | Pate et al. | |
| 2004/0027313 A1 | 2/2004 | Pate et al. | |
| 2004/0027363 A1 | 2/2004 | Allen et al. | |
| 2004/0028293 A1 | 2/2004 | Allen et al. | |

(Continued)

FOREIGN PATENT DOCUMENTS

| | | |
|---|---|---|
| EP | 1 440 844 A | 7/2004 |
| WO | WO 03/075083 A | 9/2003 |
| WO | WO 2005-039191 A | 4/2005 |

OTHER PUBLICATIONS

HDTV Forum 2003; Kinoptics Reveals Single-Panel LCOS Solution; Aug. 27, 2003.

(Continued)

*Primary Examiner*—Andrew T. Sever (57) ABSTRACT

A display system includes a light source, a spatial light homogenizer, and imaging optics. The spatial light modulator has a plurality of modulator pixels. The display system also includes a pixelated plate illuminated by the light source. The pixelated plate has a plurality of individually defined pixels formed thereon. The spatial light modulator is in optical communication with the pixelated color management device by the imaging optics and each of the modulator pixels is associated with at least one of the individually defined pixels of the pixelated plate.

50 Claims, 7 Drawing Sheets

U.S. PATENT DOCUMENTS

2004/0057017 A1 3/2004 Childers et al.
2004/0160656 A1* 8/2004 Hewlett et al. ............. 359/237
2005/0237612 A1* 10/2005 Kang ......................... 359/487

OTHER PUBLICATIONS

Krijn, Salters de Van, Light guide based optical engine for light-valve- projection, NonImaging Optics and Efficient Illumination System, V. 5529, Sep. 2004 pp. 17-26.

Vissenberg et al "Light recycling for light-valve-projection with sparkling video" NonImaging Optics and Efficient Illumination, V. 5529, Sep. 2004, pp. 276-284.

Duelli M et al, "Polarization recovery system based on light pipes", Proc. of the SPIE, V. 4657, Jan. 20, 2002, pp. 9-16.

Yu, Wang, "Efficiency Enhancement of liquid crystal projection displays using light recycle technology", Projection Displays VIII, V. 4657, 2002, pp. 62-66.

* cited by examiner

PIXELATED COLOR MANAGEMENT DISPLAY

BACKGROUND

A conventional system or device for displaying an image, such as a display, projector, or other digital imaging system, is frequently used to display a still or video image on a display surface, such as a display screen. Viewers evaluate display systems based on many criteria such as image size, color gamut, contrast ratio, brightness and resolution, for example. Image brightness, pixel color accuracy, and resolution are particularly important metrics in many display markets because the available brightness, color gamut and resolution can limit the size of a displayed image and control how well the image can be seen in venues having high levels of ambient light.

Many digital display systems create a full color display with a single light modulator by creating three or more modulated images in primary colors (red, green, and blue) per video frame. The primary colors are typically derived by passing a white light through a color wheel, prism, or some other color filter before causing the light to impinge the modulator. Sometimes, the white light is passed through a spatial light homogenizer after the color wheel to even out the intensity of the white light. The modulated images are sequentially displayed at a high rate so as to create a full color image in the human visual system. Thus, this method of generating a full color display is called "sequential color." Although the use of sequential color yields the desired red, green, and blue light for image formation, it does so by blocking the transmission of undesired light wavelengths. In other words, a significant portion of the light emitted by the light source is wasted, resulting in a decreased brightness of the final displayed image.

Color wheels add noise, thickness, expense, and complexity to a display system for a variety of reasons, including the inherent long-term reliability problems associated with moving mechanical parts. Further, approximately two-thirds (⅔) of the white light is wasted when using a color wheel because two out of the three colors (in a three-color scheme) are reflected by the color wheel at any given time. The embodiments described herein were developed in light of these and other drawbacks associated with known display systems.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

Several embodiments of a pixelated color management system having a plate of pixelated colors filters are described herein. Such pixelated color management systems, together with a spatial light modulator assembly, allows for the simplification and increased efficiency of projector assemblies. In particular, projection assemblies making use of apparatuses, systems, and methods are provided herein that reduce the complexity associated with providing light corresponding to a pixelated color schemes for use in display systems, such as digital projectors. Further, a pixelated filter element coupled to a light recycling system increases the efficiency of the display assembly by recapturing light and transmitting light that may otherwise be dissipated.

Several exemplary pixelated color management devices are discussed below that make use of a pixelated color filter to provide illumination at a spatial light modulator that is composed of individual spatial regions of pure color primaries. Although three primary systems are most common, any number of primaries may be used and also broadband white. For example, in the case of a three-primary color scheme (e.g. red, green, blue), the illumination at the spatial light modulator plane may be composed of small areas (pixels) of red, green, and blue light. This method will be referred to henceforth as simultaneous color. Accordingly, these pixelated color management devices provide full color displays without a rotating color wheel and additionally may recapture light that may otherwise be wasted. The elimination of the color wheel in a display system allows for reduced cost, decreased noise, smaller product thickness, increased light efficiency, and reduction of the overall complexity.

These exemplary pixelated color management devices may be used with a dynamic ("wobulated") light path to produce sequential yet simultaneous color without a color wheel while maintaining the light efficiency. In such systems, the light from the pixelated color management device is moved, or "wobbled", relative to the pixel array of the spatial light modulator (SLM) such that different color pixels of the pixelated plate are sequentially impinged (overlaid) upon the same pixel of the modulator to generate sequential colors. Spatial light modulators are devices that modulate incident light in a spatial pattern corresponding to an electrical or optical input. Such systems allow for the use of lower resolution SLMs than in a non-wobbled system, further reducing costs.

The term "display system" will be used herein and in the appended claims, unless otherwise specifically denoted, to refer to a projector, a front or rear projection system, image display system, television system, video monitor, computer monitor system, or any other system configured to display an image projected from the SLM. The image may be a still image, a series of images, or motion picture video. The term "image" will be used herein and in the appended claims, unless otherwise specifically denoted, to refer broadly to a still image, series of images, motion picture video, or anything else that is displayed by a display system.

As used herein and in the appended claims, a "spatial light homogenizer" (SLH) shall be broadly understood to mean any type of light guide that is capable of homogenizing light from a light source (providing uniform illumination). For example, common spatial light homogenizers include hollow or solid integrating rods, and arrays of fly's-eye lenses or lenslet integrators. Generally, the spatial light homogenizers maintain the angle of incidence of the received light. In some embodiments, the spatial light homogenizer may allow for the angles to be adjusted depending on the optical design of the projection system.

The term "imaging optics" refers to optics which transfers an image from one image plane at a first location to another image plane at a second location, with or without magnification. The "imaging optics" may provide for 'keystone' correction in one or more directions. Keystone correction allows for the imaging optics to transfer the image when the image planes at the first and second locations are not parallel in one or more axes. The first image plane is generally the plane of the pixelated plate, and the second image plane is the plane of the SLM device.

In the following description, for purposes of explanation, numerous specific details are set forth in order to provide a thorough understanding of the present method and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
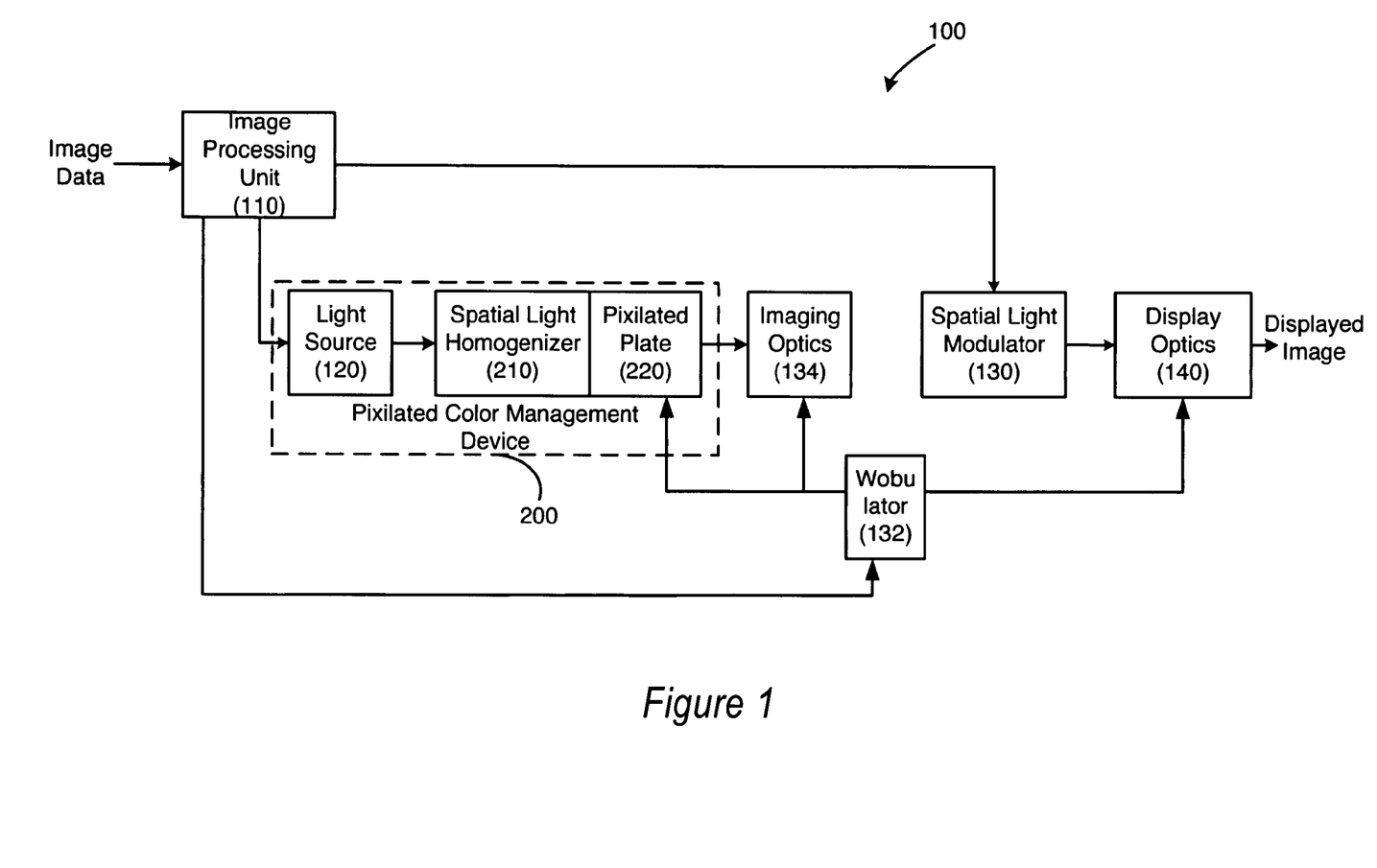
FIG. 1 is a schematic view of an exemplary display system.

FIG. 1 logically illustrates an exemplary display system (100) which encompasses the various embodiments of the invention. The components of FIG. 1 are exemplary only and may be modified or changed as best serves a particular application. As shown in FIG. 1, image data is input into an image processing unit (110). The image data defines an image that is to be displayed by the display system (100). The image displayed includes individual color components that correspond to a color scheme. For ease of reference, a red, green, and blue (RGB) color scheme will be discussed, though any number of color schemes may be used such as RGBW (with a white element), or RGBG (an additional green element) just to name a couple. While one image is illustrated and described as being processed by the image processing unit (110), it will be understood by one skilled in the art that a plurality or series of images may be processed by the image processing unit (110). The image processing unit (110) performs various functions including controlling the illumination of a light source (120), controlling a SLM (130), and optionally a wobulation unit (132). The wobulator (132) may be placed anywhere in the light path from the pixelated plate (220) to the displayed image to alter the light path. Alternatively, the wobulator (132) may physically wobulate the pixelated plate (220), the imaging optics 134, or the display optics 140. Imaging optics (134) is disposed between the pixelated plate (220) and the SLM (130) to transfer the image of the pixelated plate onto the array of pixels on the SLM. The imaging optics (134) provides for any necessary magnification or keystone correction. The imaging optics (134) may include optical elements to provide the wobulation unit (132) a method of shifting the image in one or more directions. The imaging processing unit (110) controls the wobulation unit (132) to ensure the proper synchronization of the color components of the image data are aligned in the displayed image. The image processing unit (110) will be explained in more detail below.

As shown in FIG. 1, the light source (120) provides input illumination to a pixelated color management device (200). The light source (120) may be, but is not limited to, a high pressure mercury lamp, a xenon bulb, or an array of light emitting diodes (LEDs). A pixelated color management device (200) enables the display system (100) to display a full-color image by providing different color components (e.g. red, green, blue primaries) of the full color image. More specifically, the pixelated color management device provides the different color components spatially at the spatial light modulator as opposed to temporally as in sequential color. Therefore, in systems utilizing a pixelated color management device, the displayed image will be made of up individual pixels and each pixel in the displayed image will be dedicated to a particular color (e.g. red or green or blue).

More specifically for a non-wobulated system, the image displayed by the display system is made of up individual pixels. Each pixel of the image displayed includes a non-sequential red, a green, and a blue sub-pixel component from the SLM (130) that is viewed simultaneously and integrated by the eye to form a single pixel of the image. The SLM (130) and pixelated plate (220) (also called a pixelated color filer) in this non-wobulated embodiment have three times as many pixels as the desired image. This embodiment illustrates a pixel mapping strategy between the pixelated plate (220) and SLM (130) that is 1 to 1. However, other pixel mapping strategies are possible such as, where 1 pixel from the pixelated plate (220) gets imaged to 2 pixels on the SLM (130). In this example, the SLM (130) will have (2 pixels *3 colors=) 6 times as many pixels as the desired image and the pixelated plate (220) will have 3 times as many pixels as the desired image.

In another embodiment that uses color-wobulation, a pixelated color management device (200) enables the display system (100) to display a sequential simultaneous color image by providing different color components of the full color image from pixelated plate (220) to the SLM (130) which has an array of pixels for each color element of the pixelated plate (220). The image from the pixelated plate projected onto and is wobulated over the plane of pixels on the SLM (130) over time during each image frame sequentially such that each pixel of the SLM (130) receives at least one of each color of the pixelated plate (220). More specifically, the image displayed by the display system is made of up individual pixels. Each pixel of the image displayed includes a sequential red, a green, and a blue component from the SLM (130) that is viewed sequentially and integrated by the eye to form a single pixel of the image. The SLM (130) and pixelated plate (220) in this embodiment have substantially the same number of pixels as the desired image.

As previously discussed, the pixelated plate (220) is coupled to the spatial light homogenizer (210). Light transmitted by the pixelated color management device (200) is focused and aligned onto the spatial light modulator (SLM) (130) through the imaging optics (134). The imaging optics (134) is different than the conventional illumination optics found in traditional display devices with color wheels. The imaging optics (134) must transfer the image from the pixelated plate accurately with little or no spatial distortion on the pixel array of the SLM (130) and still provide for uniform illumination at the SLM. Conventional illumination optics were only required to provide a substantially uniform illumination on the pixel array of the SLM (130).

The terms "SLM" and "modulator" will be used interchangeably herein to refer to a spatial light modulator. The incident light may be modulated in its phase, intensity, polarization, or direction by the modulator (130). Thus, the SLM (130) of FIG. 1 modulates the light output by the pixelated color management device (200) based on input from the image processing unit (110) to form an image-bearing beam of light that is eventually displayed or cast by display optics (140) on a viewing surface (not shown). The display optics (140) may comprise any device configured to display or project an image and may include optics to allow for wobulation. For example, the display optics (140) may be, but are not limited to, a lens or mirror system configured to project and focus an image onto a viewing surface. The viewing surface may be, but is not limited to, a passive screen, an active screen, or wall to create a viewing area such as a movie screen, a computer monitor, or television. The SLM (130) may be, but is not limited to, a digital mirror device (DMD), a single panel modulator device such as a liquid crystal display (LCD), a diffractive light device (DLD), and a liquid crystal on silicon (LCOS) modulator. As discussed, the use of a pixelated plate (220) coupled to the spatial light homogenizer (210) with imaging optics (134) minimizes or eliminates the need of rotating parts, such as a color wheel. Further, such a configuration can improve the efficiency of the display assembly by recapturing light (in both color or polarization) that would be otherwise wasted if the pixelated color management device (200) is designed to recycle light. The color filters on the pixelated plate (220) may be tuned to improve the performance of the display device.

Figure 2A:
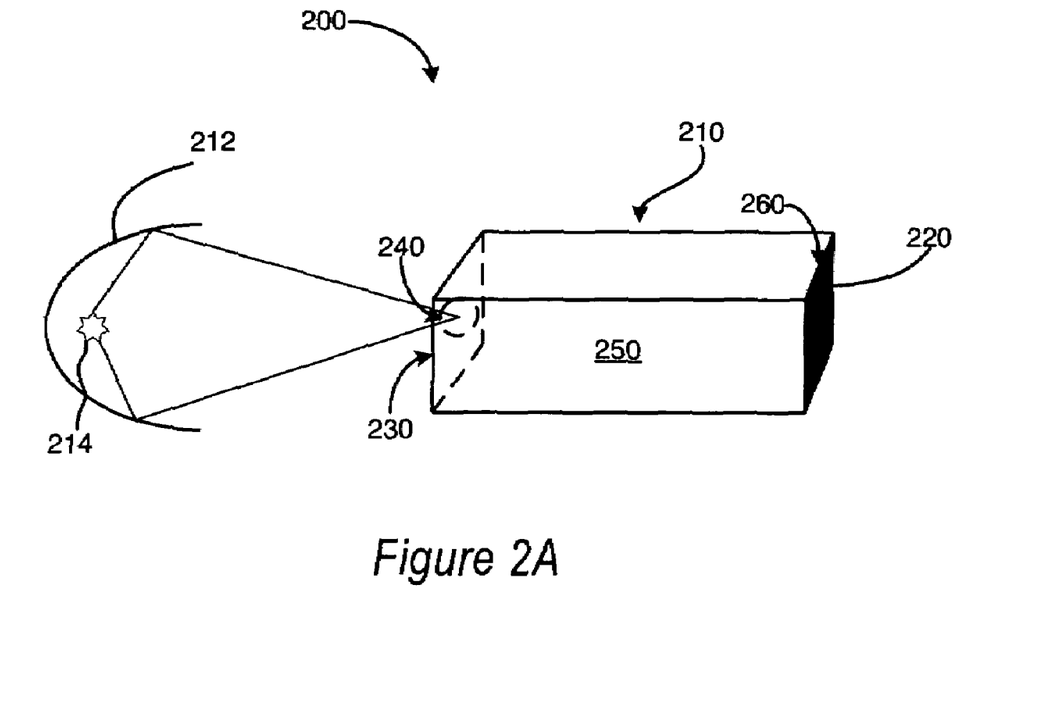
FIG. 2A is a perspective view of an exemplary pixelated color management device.
Figure 2B:
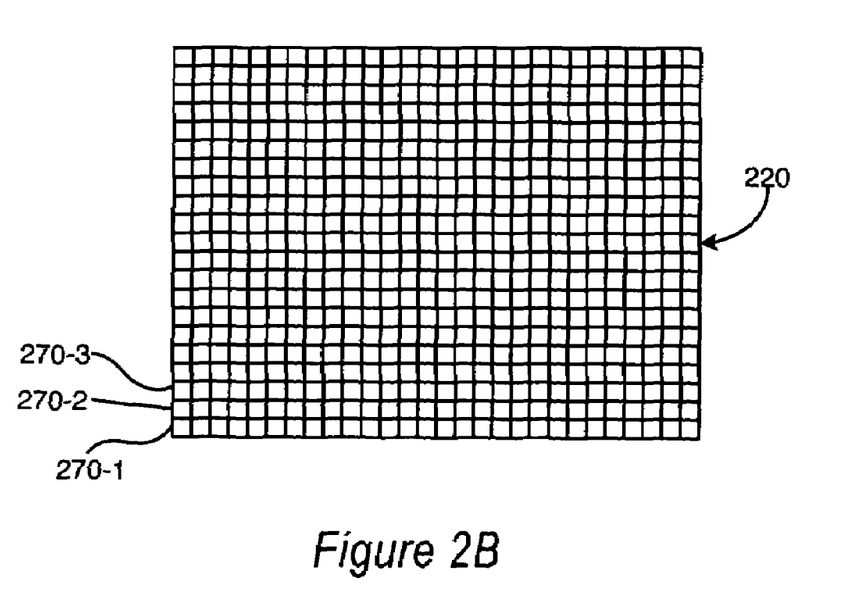
FIG. 2B is an end view of the exemplary pixelated color management device of FIG. 1.

FIGS. 2A and 2B illustrate an embodiment of a pixelated color management device (200). The pixelated color management device (200) includes an elliptical reflector (212) with a light source (214), a spatial light homogenizer (210) with a pixelated plate (220) mechanically and optically coupled thereto. For ease of reference, a solid glass integrating rod type spatial light homogenizer (210) will be discussed, though other types of spatial light homogenizers may be used. The spatial light homogenizer (210) is part of a pixelated color management device (200) that recaptures light that would otherwise be wasted and simultaneously provides light corresponding to each color of a color scheme for use by a light modulator assembly.

As shown in FIG. 2A, the spatial light homogenizer (210) includes a partially reflective front face (230). The portion of the front face (230) that is not reflective may be referred to as the light entrance aperture (240). In other words, the light entrance aperture (240) is the portion of the front face (230) where no reflective material has been deposited. The light entrance aperture (240) receives the light from the elliptical reflector (212). Alternatively, a parabolic reflector and a lens may be substituted to provide light to the light entrance aperture (240). The spatial light homogenizer (210) also includes several reflective side surfaces (250) between the front face (230) and an end face (260). Light that enters the spatial light homogenizer (210) enters through the light entrance aperture (240) of the front face (230) and is guided by the reflective side surfaces (250) through the spatial light homogenizer 210 and out of the end face (260) and to the pixelated plate (220).

The pixelated plate (220) is mechanically and optically coupled to the end face (260) of the spatial light homogenizer (210). The pixelated plate (220) may be thus secured to the spatial light homogenizer (210) through the use of an adhesive, such as an epoxy. Accordingly, any gap between the spatial light homogenizer (210) and the pixelated plate (220) is minimized or eliminated.

FIG. 2B illustrates the pixelated plate (220) in more detail. The pixelated plate (220) includes a plurality of sharply defined pixels (270-1, 270-2, 270-3). In one exemplary embodiment, the pixels (270-1, 270-2, 270-3) shown may be substantially rectangle/square pixels with sides having lengths of approximately 5 microns (µm). However, the pixels may be any shape (e.g. diamond, rectangular, trapezoidal, oval, square, etc.). Further, the pixel shape and size may vary within a given pixelated color filter, for example, red pixels may be 5×10 µm rectangles while the blue pixels may be 5×5 µm squares.

The pixelated color filter may be created by a variety of techniques and the embodiments disclosed herein are not to be limited to any particular technique. In one embodiment, pixels of a particular color (e.g. red reflecting pixels) may be formed onto a glass plate by depositing dielectric thin films to produce a dichroic interference filter. Lithographic techniques may then be used to pattern the dichroic interference filter to produce pixels. This process may be repeated for each pixel color required on the pixelated color filter. The spectral transmission response for each dichroic interference filter deposited on the pixelated color filter can be tuned to yield optimized system performance including color gamut, luminous efficiency, and/or contrast. Alternatively, the pixelated color filter may be created using diffraction grating type structures or Bragg scattering type structures. Note that in these embodiments the pixelated color filter is entirely static, that is, no electrical drive, external signal, or power supply is required for operation. Other arrangements are possible, and the embodiments disclosed are not to be so limited.

Each pixel selectively allows light of certain wavelengths to pass while reflecting other wavelengths. The pixels shown (270-1, 270-2, 270-3), which are shown much larger than scale for ease of reference, correspond to a red/green/blue (RGB) color scheme. Accordingly, a red pixel reflects blue and green light while allowing red light to pass. Similarly, a green pixel allows green light to pass and a blue pixel allows blue light to pass.

As a result, approximately ⅔ of light associated with white light is reflected by the pixelated plate (220) when white light is first incident thereon. A substantial portion of this reflected light passes back through the spatial light homogenizer (210) to the reflective surface of the front face (230). The light is then reflected from the reflective surface of the front face (230) through the spatial light homogenizer (210) and back to the pixelated plate (220). When the light reaches the pixelated plate, it can be recaptured by passing through a different color segment. For example, blue and green portions of white light impinging on a red pixel of the pixelated plate are reflected back into the spatial light homogenizer (210). That blue and green light is reflected around the inside of the spatial light homogenizer (210) until it again passes through the end surface (260) of the spatial light homogenizer (210) and impinges upon the pixelated plate (220). This time, the previously-reflected blue and green light may impinge upon a blue (or green) pixel of the pixelated plate (220), which will allow the blue light (or green light) to pass through and reflect the green light (or the blue light) back into the spatial light homogenizer (210). In this way, light that was previously lost may be "recaptured", thereby increasing the luminous efficiency of the system.

The close proximity of the pixelated plate (220) with respect to the end face (260) of the spatial light homogenizer (210) further increases the amount of light that is recaptured by the pixelated color management device (200). In particular, as previously discussed, the gap between the end face (260) and the static pixelated element (220) is minimal. In one embodiment, the pixelated plate (220) is adhered directly to the end surface (26) of the spatial light homogenizer (210). Accordingly, less light is able to escape through the gap, thereby further increasing the amount of light conveyed to the SLM (130; FIG. 1).

In one embodiment, each pixel of the pixelated plate corresponds to a pixel on the SLM (130) (FIG. 1). That is, the light that passes through each of the colored pixels on the pixelated plate (220) impinges on a corresponding pixel on the SLM (130). Accordingly, each of the pixels on the SLM (130) is "dedicated" to modulating one of the colors of the color scheme. Thus, the modulation frequency of each pixel may be correspondingly slower than in a conventional color wheel sequential color system. Other benefits can be achieved such as with a four color scheme. For instance, with a RGBG scheme, twice as many green pixels are used. This allows for a slightly higher resolution green image to be formed while having slightly lower resolution red and blue images. As the eye is more sensitive to green images, a person viewing the image would perceive a higher resolution image. By using a RGBW scheme, the gamut may be changed for particular applications such as business chart presentations.

In general, it is not required to have one-to-one pixel mapping between pixels on the pixelated color filter and pixels on the SLM. For example, single red pixels on the pixelated color filter may be imaged to blocks of four pixels on the SLM. Regardless of the pixel mapping strategy, during each sub-frame of image generation, each pixel on the SLM is "dedicated" to modulating a single color output by the pixelated color filter (e.g. red or blue or green or broadband white).

In addition to providing simultaneous color to minimize or eliminate the need of rotating parts, such as a color wheel, the pixelated plate (220) may be formed accordingly to enhance color characteristics. For example, the pixels (270-1, 270-2, 270-3; FIG. 1) may be tuned to boost contrast and color gamut, while at the same time maintaining or improving brightness. This tuning will be discussed with reference to a pixelated plated (120) as applied to a single panel micro-display system such as a digital light device (DLD) using Fabry-Perot interference filters in the SLMs. Such single panel micro-displays have controls for modulating each of the pixel components of the color scheme on a single panel.

One example of how the color characteristics may be enhanced includes the use of notch band filters in the pixelated plate (220) to enhance black state spectral response. Black state spectral response refers to the ability of an SLM to produce black at each wavelength across a wavelength band, for example, the visible band. Notch band filters are filters incorporated in the dichroic films of the pixels (270-1, 270-2, 270-3; FIG. 2B) of the pixelated plate (220) that are selectively tuned to allow a narrower portion, or a notch band, of the light spectrum to pass there through.

With respect to the pixelated plate (220), the black state spectral response may be tailored individually for red, green, and blue pixels. Each black state response curve discussed below depicts the performance of individual modulator pixels. In one embodiment, the pixels of the pixelated plate (220) are formed with or as notch band filters. Accordingly, the light transmitted by each SLM pixel corresponds to light that has passed through the tuned pixels of the pixelated plate (220). For example, the minimums for these three black state spectral responses, or notch bands, may be designed to fall around 630, 555, and 425 nm respectively. Accordingly, the notch band filters allow light centered around narrow red, blue, and green wavelengths to pass through while limiting the transmission of other wavelengths.

Figure 3:
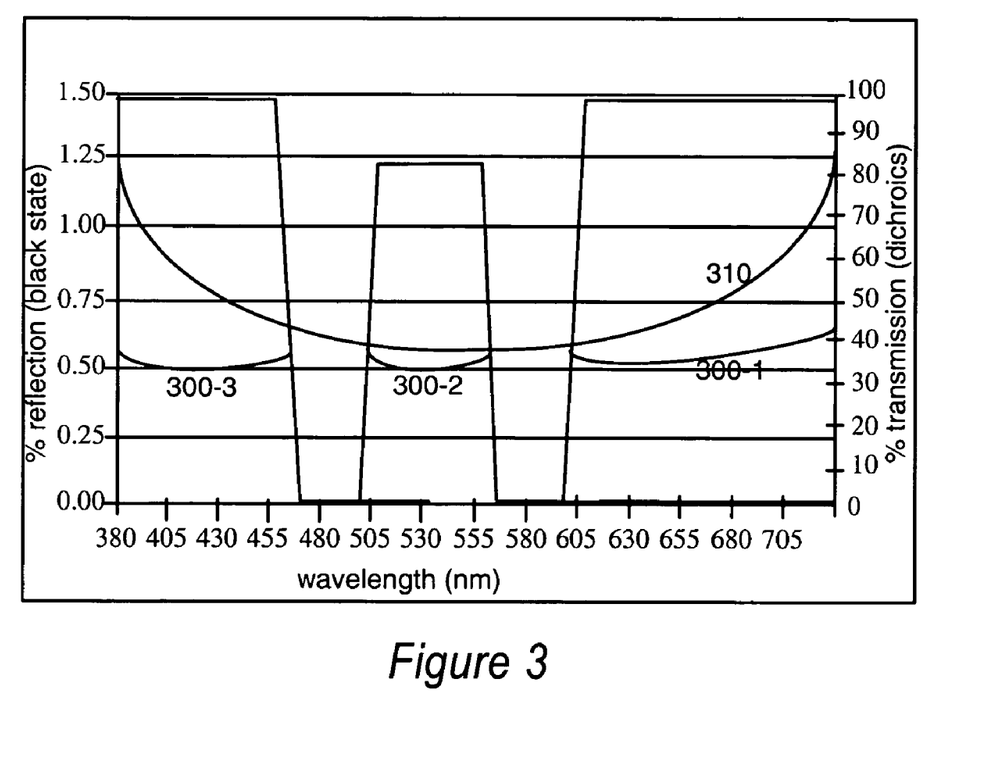
FIG. 3 is an exemplary graph showing the output of a broadband optimized black state output and the output of a pixelated element with tuned notch bands.

FIG. 3 depicts these individual RGB black state responses for R (300-1), G (300-2), and B (300-3) respectively from the pixelated plate (220; FIG. 2) that makes use of the notch band filters. FIG. 3 also shows the black state spectral response (310) for a light modulator that optimizes the black state spectral response over the entire visible region but is not uniform. This broadband optimization focuses on the absorption of light across the entire visible spectrum, yet has non-uniform rejection at different wavelengths as shown.

The area underneath each of the curves represents the amount of light transmitted. As seen in FIG. 3, the total area under the three black state responses (300-1, 300-2, 300-3) is significantly less than the area under the broadband optimized black state response (310). Accordingly, more of the light that passes through the pixelated plate (220; FIG. 2) is absorbed by the SLM. The result of the higher absorption of the SLM in the black state leads to a darker black state overall. As previously discussed, the recapture of light increases the amount of light transmitted to the SLM, thereby also improving on the on state response. Contrast is measured by comparing the difference between a black state response and an on state response. Accordingly, in addition to providing increased brightness, the pixelated plate (220; FIG. 2) may be configured to increase the contrast of images formed by the SLM while minimizing the need for rotating parts. This is done by increasing the brightness, improving the black state response, or both. Further, as will be discussed in more detail below, light management, including polarization recovery and color management, may be incorporated in a single device.

Figure 4A:
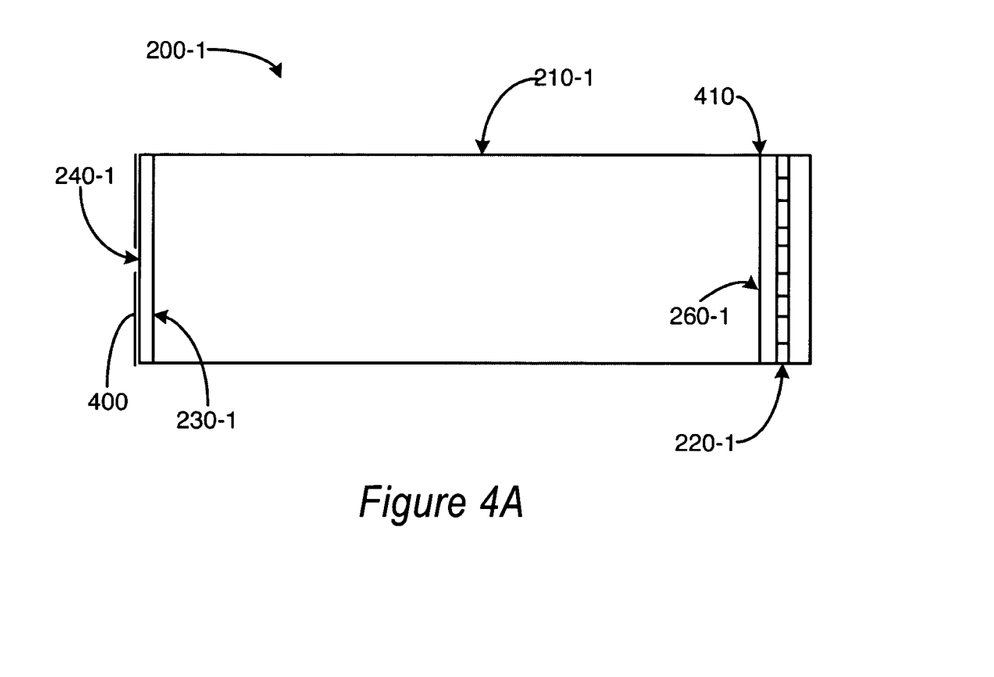
FIG. 4A is a side view of an exemplary pixelated color management device.
Figure 4B:
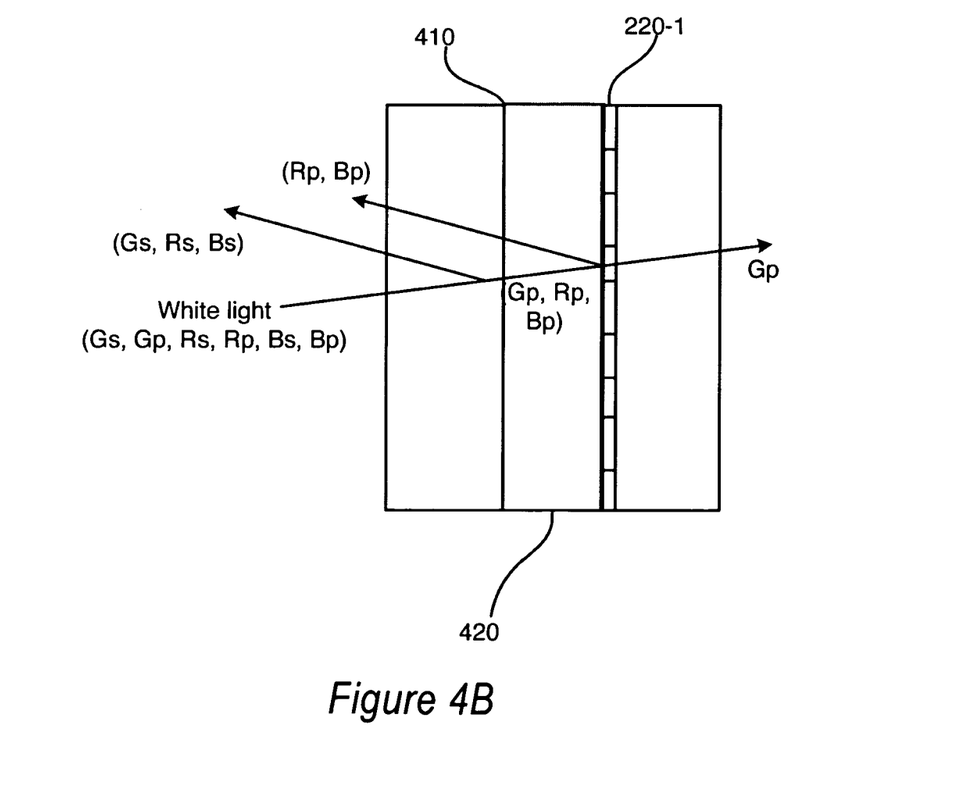
FIG. 4B is a partial view of the pixelated management device of FIG. 4A.

FIGS. 4A and 4B illustrate a pixelated color management device (200-1) that implements polarization recovery and color management features. This color management device may be used with polarization based SLMs or micro-displays, such as LCD and LCOS. FIG. 4A illustrates the entire pixelated color management device (200-1), which includes a spatial light homogenizer (210-1) with a ¼ wave retarder (400), a reflective linear polarizer (410), and a pixelated plate (220-1) coupled thereto on end face (260-1). The ¼ wave retarder (400) rotates the polarity of light that is rejected by the pixelated plate (220-1) and/or the reflective linear polarizer (410) by 90 degrees in double pass. White light from a light source (not shown in FIG. 4A but generally the light source includes an elliptical reflector and a high pressure mercury or xenon bulb as in FIG. 2A) enters the spatial light homogenizer (210-1) through a hole (240-1) defined in the mirrorized ¼ wave retarder (400), which is coupled to the front face (230-1) of the spatial light homogenizer (210-1). The ¼ retarder (400) has no net effect on unpolarized light as it enters the spatial light homogenizer (210-1).

FIG. 4B illustrates a partial magnified view of the end face (260-1) of the pixelated color management device (200-1) with the reflective linear polarizer (410) and pixelated plate (120-1) separated by a spacer (420). After the light has passed through the hole (240-1) as discussed previously, the light traverses the spatial light homogenizer (210-1) until it is incident on the reflective linear polarizer (410), for example, a wire grid polarizer. The polarizer (410) rejects S polarized light and transmits P polarized light. The P polarized light that passes through the wire grid polarizer is then filtered by the pixelated plate (220-1).

Light (Gs, Rs, Bs) that is rejected by the reflective linear polarizer (410) and/or light (Rp, Bp) that is rejected by the pixelated plate (220-1) returns to the mirrorized ¼ wave retarder (400). The ¼ wave retarder rotates the polarization of the light by 90 degrees in double pass and redirects it through the spatial light homogenizer (210-1) to the pixelated plate (220-1) and the reflective linear polarizer (410). Accordingly, the configuration of the pixelated color management device (200-1) is able to recapture light rejected by the pixelated plate (220-1) and recover polarized light by changing the polarity within the spatial light homogenizer (210-1) for use by an SLM. By recapturing light based on both polarization and color, the static color management device according to FIGS. 4A and 4B can provide sufficient luminous efficiency to enable single microdisplay architectures in a small form factor.

Figure 5:
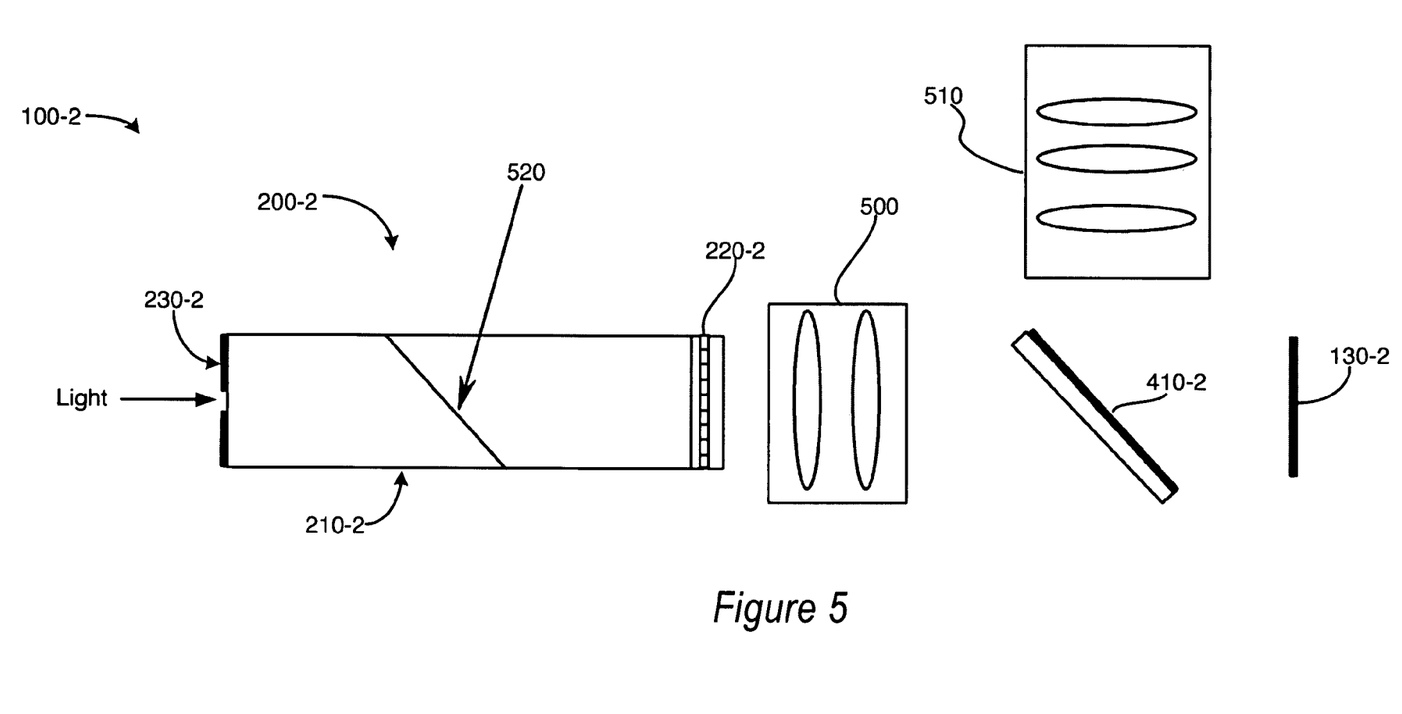
FIG. 5 is a schematic view of an exemplary pixelated display system.

FIG. 5 illustrates a schematic view of a display system (100-2) that makes use of liquid crystal on silicon (LCOS) type SLM (130-2). The display system is configured to provide color recovery and polarization recovery. The display system (100-2) generally includes a light source (not shown, but generally the light source includes an elliptical reflector and a high pressure mercury or xenon bulb as in FIG. 2A), a pixelated color management device (200-2), imaging optics (500), a reflective linear polarizer (410-2), an LCOS type SLM (130-2), and display optics (510), a projection lens. A ¼ wave retarder dielectric stack (520) and a wire grid polarizer (410-2) perform these polarization functions, as is discussed below.

The pixelated color management device (200-2) has a ¼ wave retarder dielectric stack (520) disposed within the spatial light homogenizer (210-2) (such as a hollow reflective integrating rod) and a pixelated plate (220-2) coupled to the end of the spatial light homogenizer (210-2). A person skilled in the art will recognize other ways to effectuate a ¼ wave retardation that could be used in place of the ¼ wave retarder dielectric stack (520) shown in FIG. 5. Light enters the spatial light homogenizer (210-2) through an aperture in the mirrorized front face (230-2) of the spatial light homogenizer and is passed through the ¼ wave retarder (520). The ¼ wave retarder (400) rotates the polarity of light that is rejected by the pixelated plate (220-1) and/or the reflective linear polarizer (410) by 90 degrees in double pass. Thereafter, the light is filtered through the pixelated plate (220-2). The light that passes through the pixelated plate (220-2) includes all the color components used in the color scheme, such as red, green, and blue light, which has been already polarized once.

Once the light exits the pixelated color management device (200-2), the light is passed through the imaging optics (500) and on to the reflective polarizer (410-2). The reflective polarizer (410-2) is oriented at a 45 degree angle with respect to a major axis of the spatial light homogenizer (210-2). This orientation of the reflective polarizer (410-2) allows light directed thereto from the pixelated color management device (200-2) to pass through and be polarized a second time. As the light passes through the reflective polarizer (410-2) it is directed to the LCOS type SLM (130-2).

A digital signal generated in a similar manner as previously discussed with reference to FIG. 1 causes voltages on the LCOS type SLM (130-2) to arrange in a given configuration to form the image. The image from the LCOS type SLM (130-2) is directed back to the reflective polarizer (410-2). The 45 degree orientation of the reflective polarizer (410-2) causes the light from the SLM to be reflected to display optics (510), which magnify and focus the image for display on a screen (not shown). Accordingly, the pixelated color management device (200-2) may be used to simplify how light is filtered and polarized for use by a display system (100-2) that makes use of an LCOS type SLM (130-2). Other optical architectures are possible, however, even including off-axis illumination.

In brief summary, several applications of pixelated color management devices make use of pixelated plates. Thus far, the pixelated color management devices and pixelated plates have been discussed in the context of recapturing light that would otherwise be wasted, while at the same time reducing the complexity of a display system by reducing or eliminating the use of rotating parts. As will now be discussed in more detail, a pixelated plate may also be used to display sequential simultaneous color fields.

Figure 6:
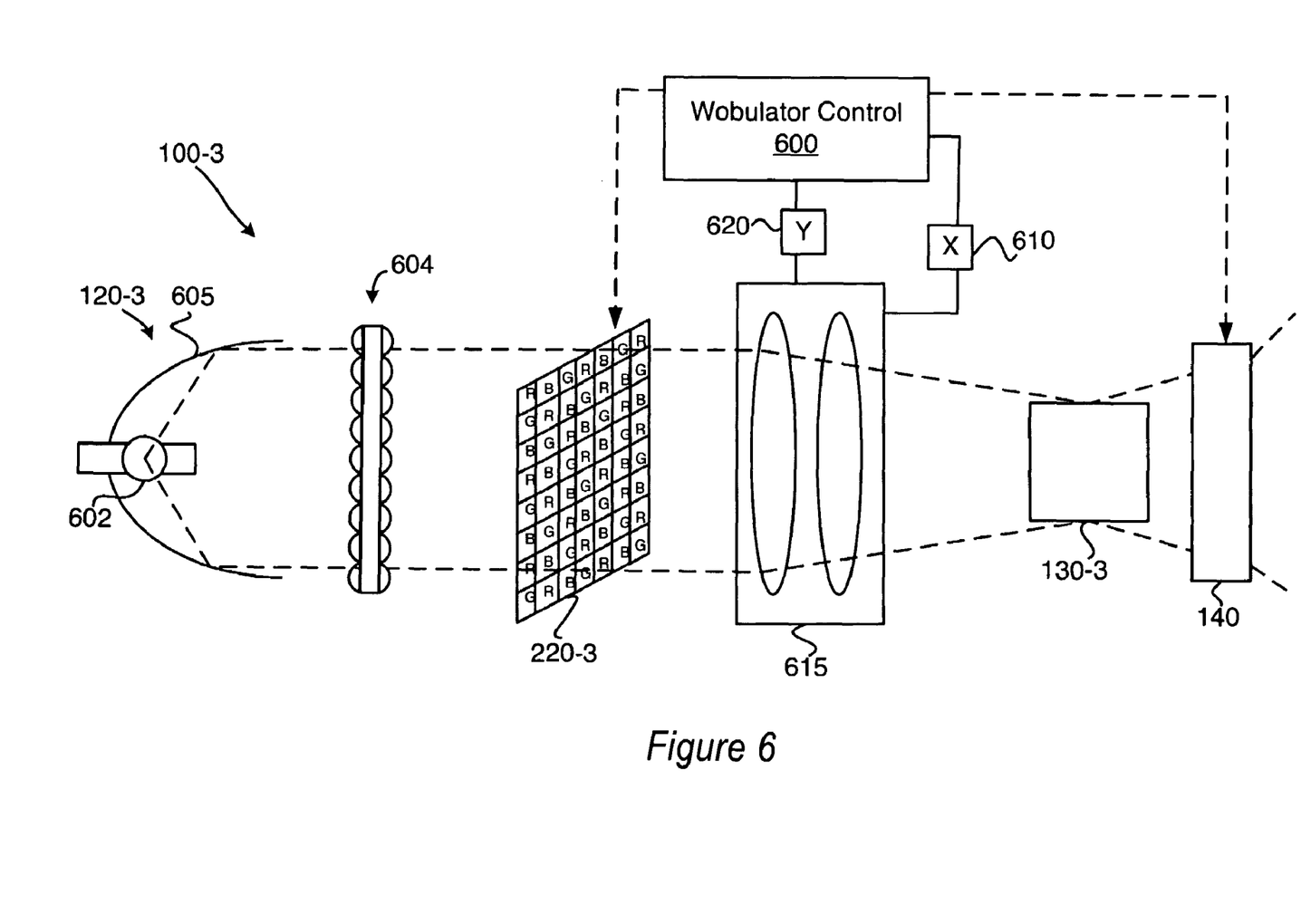
FIG. 6 is a schematic view of an exemplary pixelated display system.

FIG. 6 illustrates a display system (100-3) that includes a wobulator control (600) coupled to the imaging optics 615. As shown in FIG. 6, the pixelated plate (220-3) is used with an optional fly's eye type spatial light homogenizer (604) Those of skill in the art will appreciate that other spatial light homogenizer may be substituted as desired. Alternatively, an elliptical mirror and integrating rod may be used to illuminate the pixelated plate (220-3) with appropriate changes to the imaging optics (615). In addition, a ¼ wave retarder and a polarizer coupled to the spatial light homogenizer may be used depending on the type of SLM such as an LCD or LCOS SLM device. For example, the ¼ wave retarder is coupled to a front face of the spatial light homogenizer and the polarizer is coupled to an end face of the spatial light homogenizer. As seen in FIG. 6, the display system (100-3) operates similarly to the display systems previously discussed. In particular, the display system (100-3) the display system makes use of lamp (602) (such as a high pressure mercury or xenon bulb) that produces light. A parabolic reflector (605) creates a substantially parallel (collimated) beam and directs this light to the pixelated plate (220-3) which filters the light. Optionally, a spatial light homogenizer 604, for example, a fly's eye homogenizer, is used to make the light from the parabolic reflector more uniform in irradiance before reaching the pixelated plate (220-3). This embodiment allows for a larger pixelated plate than when attached to the end of an integrating rod, which may be easier to manufacture. In addition, the individual pixel filters may still be made with dichroic materials to allow for reflection of the undesired light. This reflected light is then redirected back to the parabolic reflector and recycled to return to the pixelated plate (220-3). The recycled light eventually strikes another filter in the pixelated plate (220-3) which allows it to be transmitted. Thus, this embodiment also allows for the recycling of light. The filtered light then passes through imaging optics (615) that transmits (projects) the image of the pixelated plate (220-3) onto the pixel array of the SLM (130-3). The light from the SLM (130-3) is then coupled to the display optics (140) to be projected on a rear or front screen (not shown) as desired. The wobulator control (600) is used to control the placement of the image from the pixel plate onto the SLM (130-3) or alternatively to move the projected image by wobulating the display optics 140. In one embodiment as shown, the wobulator control (600) is coupled to the imaging optics (615) to redirect the light path of the light passing through it. In another embodiment, the wobulator control (600) is coupled to a device the holds the pixelated plate (220) to change its X and/or Y axis. In another embodiment, the wobulator control is coupled to the display optics (140) to change its X and/or Y axis locations and thus the alignment of the displayed image on the front or rear screen.

Wobulator control, or wobulation, refers to a process of shifting the position of a light path relative to the SLM (130-3) or the projected image. In other words, the wobulator control (600) may shift the position of the light path from/or the pixelated plate (220-3) such that each modulator pixel ultimately displays light received from a different color filter position on the pixelated plate (220-3). Alternative, the display image may be shifted by the display optics (130-3) such that each pixel of the displayed image receives a different color. The wobulation concept for partial pixel movement to increase resolution is discussed in commonly assigned U.S. Published Patent Application 20040028293 filed Aug. 7, 2002, and is hereby incorporated by reference in its entirety. In the embodiments disclosed herein, "color-wobulation" is generally used to control movement of an entire (integral) pixel position so that one of each color is physically mapped with respect to each pixel element of the SLM (130-3).

Accordingly, the use of wobulator control (600) allows a single unitary pixel on the SLM (130-3) to sequentially receive light from corresponding pixels (270-1, 270-2, 270-3) on the pixelated plate (220-3) or to project individual colors to multiple pixels of a final displayed image. In other words, there is a substantially a 1:1 correspondence between the number of pixels on the pixelated plate and the associated unitary pixels on the SLM that are used to display an image. The pixelated plate may be increased in size slightly to accommodate some overlap of the pixels due to the shift from wobulation. Thus, there may be one, two, or more additional rows and/or columns of color filter pixels than the number of rows and columns on the pixel array of the SLM.

Figure 7A:
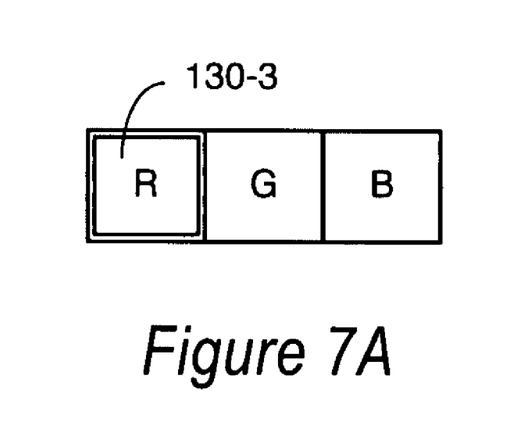
FIGS. 7A-7C are exemplary one dimensional wobulation shifts of the pixelated plate with respect to a modulator pixel.
Figure 7B:
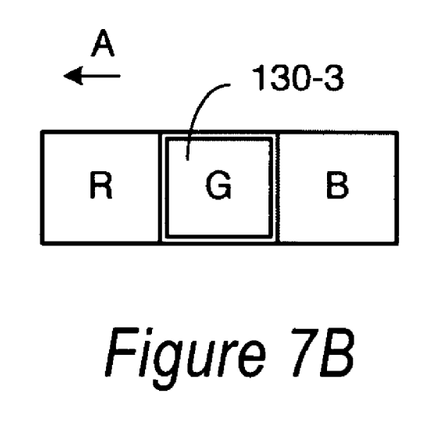
Figure 7C:
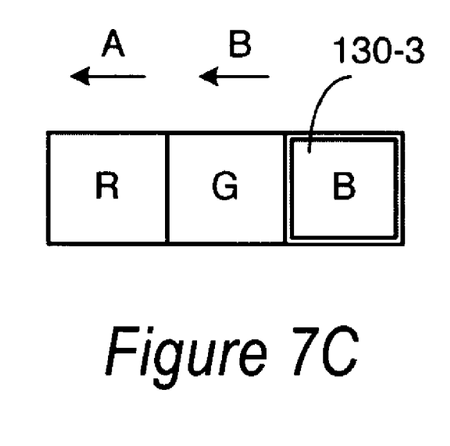
Figure 8A:
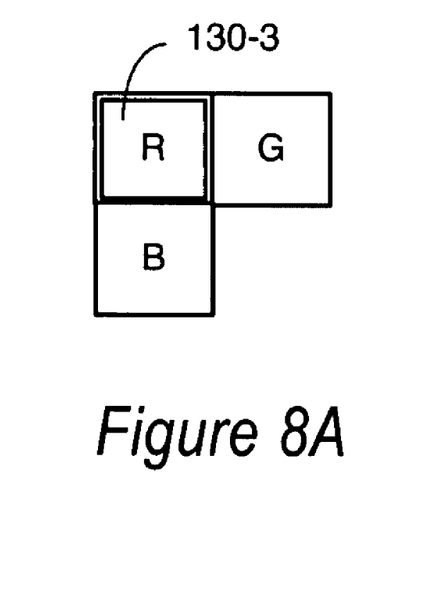
FIGS. 8A-8C are exemplary 2 dimensional wobulation shifts of the pixelated plate with respect to a modulator pixel.
Figure 8B:
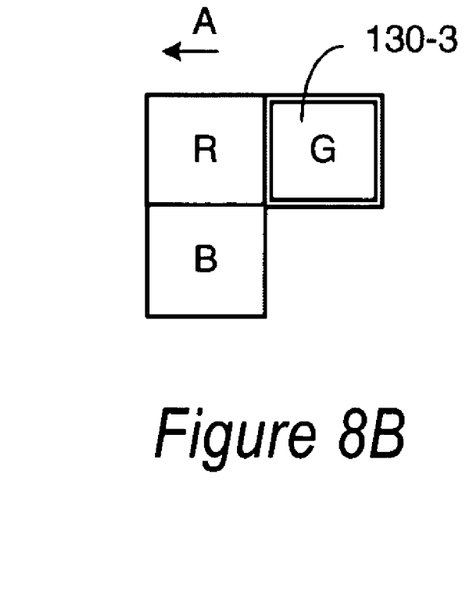
Figure 8C:
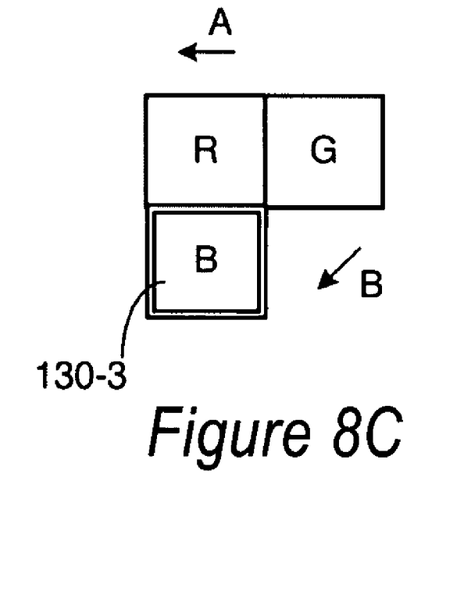

The wobulator control (600) provides sequential color display by using either or both the x-axis controller (610) and the y-axis controller (620) to physically shift the position of the image of the pixelated plate on the pixel array of the SLM such that each modulator pixel displays light received from red, green, and blue pixels (270-1, 270-2, 270-3). In particular, the pixels of the pixelated plate (220-3) are arranged in rows. The pixels in the first row are R, B, G, R, B, G, R; the second row of pixels are G, R, B, G; R, B, G and the third row are B, G, R, B, G, R, B. The forth row is a repeat of the first row, and the pattern continues. Other color schemes can be used, including, without limitation a red, blue, green, and white color scheme FIGS. 7A-7C are exemplary one-dimensional shifts of the pixelated plate with respect to a modulator pixel. FIGS. 8A-8C are exemplary two-dimensional shifts of the pixelated plate with respect to a modulator pixel. Those skilled in the art will recognize that other shift patterns are possible and would still fall within the scope of the invention. The modulator pixel of SLM (130-3) is shown as slightly smaller than the pixelated plate pixel for better illustration. As an example, beginning with an initial reference position in FIGS. 7A and 8A, the SLM (130-3) displays light received from a first position of the pixelated plate with respect to the modulator pixel. Thereafter, the wobulator control (600) shifts the image of the pixelated plate relative to the pixel array of the SLM (as shown by the arrow A) such that the SLM displays light from a second position, which is located to the right of the first position in FIGS. 7B and 8B. The wobulator control (600) then shifts the SLM (130-3) such that the SLM displays light from a third position (as shown by the arrow B). The third position is located to the right of the second position in FIG. 7C. The third position is located directly down from the first position and down and left from the second position in FIG. 8C. Finally, the wobulator control (600) shifts the pixelated plate image relative to the SLM (130-2) such that the SLM again displays light received from the first position.

Each location corresponds to a pixel on the pixelated plate and the spatial distance of each shift corresponds to one full pixel. Accordingly, each pixel of the SLM (130-3) is able to receive light from R, G, and B pixels being displayed sequentially in every pixel location, thereby providing a sequential simultaneous color field display while minimizing or eliminating the use of a color wheel such that the rapid succession of the image sub-frames appears as a single displayed full-colored image.

Accordingly, the use of the wobulator control (600) with the pixelated plate (120-3) provides a sequential color display where individual color is performed on a pixel-by-pixel basis. Providing sequential simultaneous color display on a pixel-by-pixel basis may allow for the use of lower speed modulators that make use of this special form of sequential pixelated color. For example, conventional color-wheel sequential color displays suffer from what is known as a rainbow effect. This effect is an optical anomaly in which a rainbow is visible due to the sequential color presentation of individual colors across the entire display. This effect may be especially prominent when a color wheel is used because all of the light associated with each color component of the image is projected from the color wheel and onto the entire array of pixels of the SLM. Frequently, when an entire image is displayed at lower speeds using sequential color produced by a color wheel the rainbow effect is intensified. Accordingly, color wheels operate at relatively high speeds in order to minimize rainbow effects.

As introduced, the use of wobulator control (600) provides sequential color display on a pixel-by-pixel basis. As a result, the output of each pixel is combined to provide one full-color pixel rather than combining each color frame to provide one-full color image. Accordingly, the rainbow effect for a given color refresh frequency will be less significant, thereby allowing the use of sequential color display with a relatively low speed SLM.

In conclusion, a pixelated plate and pixelated color management devices allow a projector system to provide simultaneous full color displays while minimizing or eliminating the necessity of a color wheel, while at the same time allowing light to be recaptured that may otherwise be wasted. The elimination of the rotating parts, such as a color filter wheel, reduces the cost and complexity of a display system. In addition, a pixelated plate may be used in combination with a wobulator control to provide sequential simultaneous color display.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. A pixelated color management device, comprising:
a light source;
a spatial light homogenizer optically coupled to the light source;
a pixelated plate optically coupled to the spatial light homogenizer, the pixelated plate having a plurality of individually defined pixels for each of a plurality of colors;

a spatial light modulator having a plurality of individually defined pixels; and imaging optics for projecting the image of the individually defined pixels of the pixelated plate onto the individually defined pixels of the spatial light modulator.

2. The device of claim 1 wherein the individually defined pixels of the pixelated plate are made of dielectric material wherein the light reflected from the pixelated plate is substantially recycled within the pixelated color management device.

3. The device of claim 2 wherein the light source includes a parabolic reflector and wherein the light reflected from the pixelated plate is reflected back to the parabolic reflector before being recycled.

4. The device of claim 2, wherein the spatial light homogenizer includes a reflective front face with a light entrance aperture and an end face, the spatial light homogenizer being configured to guide light between the reflective front face and the end face to recycle the light.

5. The device of claim 4, wherein the spatial light homogenizer comprises a glass integrating rod.

6. The device of claim 1, wherein the pixels of the pixelated plate are rectangular-shaped pixels having a size of approximately 5 μm per side.

7. The device of claim 1, wherein the pixels of the pixelated plate correspond to a color scheme.

8. The device of claim 7, wherein the color scheme is a red, green, and blue color scheme.

9. The device of claim 7, wherein the pixels of the pixelated plate comprise notch band filters corresponding to each color of the color scheme.

10. The device of claim 1, and further comprising a ¼ wave retarder and a polarizer coupled to the spatial light homogenizer.

11. The device of claim 10, wherein the ¼ wave retarder is coupled to a front face of the spatial light homogenizer and the polarizer is coupled to an end face of the spatial light homogenizer.

12. The device of claim 10, wherein the polarizer comprises a reflective polarizer.

13. The device of claim 1, and further comprising a ¼ wave retarder disposed within the spatial light homogenizer.

14. The device of claim 13, wherein the ¼ wave retarder is oriented at a 45 degree angle with respect to a major axis of the spatial light homogenizer.

15. The device of claim 1, further comprising:
a wobulation control circuit, wherein the wobulatlor, control circuit is configured to move an image of the pixelated plate formed by the imaging optics relative to the array of pixel elements.

16. The device of claim 15 wherein the wobulation control circuit modifies the optical path within the imaging optics in a least one direction.

17. The device of claim 15 wherein the wobulation control circuit controls at least one of an X and a Y direction of the pixelated plate.

18. The device of claim 15, further comprising:
display optics optically coupled to the spatial light modulator to project the individual array of pixels of the spatial light modulator in an X and Y direction to a display surface, and wherein the wobulation control circuit controls at least one of the X and Y direction of the display optics.

19. The device of claim 1 wherein the pixelated plate and the array of pixel elements are in non-parallel planes and the imaging optics provides keystone correction.

20. A display system, comprising:
a light source;
a spatial light homogenizer having a plurality of modulator pixels; imaging optics; and
a pixelated plate illuminated by the light source, the pixelated plate having a plurality of individually defined pixels for each of a plurality of colors formed thereon, wherein the spatial light modulator is in optical communication with the pixelated color management device by the imaging optics and each of the modulator pixels is associated with at least one of the individually defined pixels of the pixelated plate.

21. The system of claim 20 wherein the spatial light homogenizer includes a reflective front face with a light entrance aperture and an end face, the spatial light homogenizer being configured to guide light between the reflective front face and the end face.

22. The system of claim 20 wherein the light source includes a parabolic reflector.

23. The system of claim 20, wherein the spatial light modulator comprises a digital mirror device.

24. The system of claim 20, wherein the spatial light modulator comprises a single panel diffractive light device.

25. The system of claim 20, wherein the spatial light modulator comprises a liquid crystal on silicon device.

26. The system of claim 20, wherein the spatial light modulator comprises a transmissive LCD microdisplay.

27. The system of claim 20, further comprising a ¼ wave dielectric plate disposed within the spatial light homogenizer and a 45 degree wire grid filter located between the pixelated plate and the spatial light modulator.

28. The system of claim 20, further comprising a wobulation control circuit configured to move the plurality of individually defined pixels of the pixelated plate relative to the plurality of modulator pixels of the spatial light modulator.

29. The system of claim 28 wherein the wobulation control circuit controls at least one of an X and a Y direction of the pixelated plate.

30. The system of claim 28, further comprising:
display optics optically coupled the spatial light modulator for projecting an image and wherein the wobulation control circuit modifies the optical path within the display optics.

31. The system of claim 28 wherein the pixelated plate and the plurality of modulator pixels are in non-parallel planes and the imaging optics provides keystone correction.

32. The system of claim 20, wherein the imaging optics is disposed between the pixelated plate and the spatial light modulator.

33. The system of claim 32 wherein the wobulation control circuit modifies the optical path within the imaging optics.

34. A display system. comprising:
a light source;
a pixelated plate having a plurality of individually defined pixels in each of a plurality of colors formed thereon, the pixelated plate being in optical communication with the light source;
a spatial light modulator in optical communication with the pixelated plate; imaging optics disposed between the pixelated plate and the spatial light modulator; and
a controller coupled to the imaging optics, the controller being configured to shift a position of the pixelated plate relative to the spatial light modulator.

35. The system of claim 34. wherein the spatial light modulator has a plurality of pixels, and each the modulator pixels is associated with a plurality of the pixels on the pixelated plate over a sequential time frame.

36. The system of claim 34, wherein the pixels of the pixelated plate correspond to a color scheme.

37. The system of claim 34, wherein the color scheme comprises a red, green, and blue color scheme.

38. The system of claim 34, wherein the color scheme comprises a red, green, blue, and white color scheme.

39. The system of claim 34, wherein the controller is configured to shift a position of the spatial light modulator one pixel in at least one direction relative to the pixelated plate.

40. A display system, comprising:
a light source;
means for simultaneously providing a plurality of colors to each of a plurality of pixels, the means being optically coupled to the light source:
a spatial light modulator optically coupled to the means for providing simultaneous pixelated color providing a color field display; and
means for moving the simultaneous pixelated color relative to the spatial light modulator.

41. The system of claim 40, further comprising means for recapturing light.

42. The system of claim 40, further comprising means for polarizing light.

43. The system of claim 40, further comprising means for recapturing polarized light.

44. A display system, comprising:
means for providing a plurality of pixelated color components in each of a plurality of colors;
a spatial light modulator optically coupled to the means for providing a plurality of pixelated color components; and
means for shifting a position of the spatial light modulator relative to the means for providing a plurality of pixelated color components.

45. The method of claim 44, further comprising the step of repetitively adjusting the position of the pixelated plate relative to the spatial light modulator so as to cause light passing through a plurality of pixels on the pixelated plate to sequentially impinge an associated one pixel of the spatial light modulator.

46. The method of claim 44, further comprising the steps of:
projecting the light from the spatial light modulator to create a displayed image;
adjusting the position of the displayed image relative to a previously displayed image from the spatial light modulator so as to cause light passing through a plurality of pixels on the pixelated plate to sequentially impinge an associated one pixel of an perceived displayed image.

47. A method for generating color display images, comprising:
passing substantially white light through a spatial light homogenizer onto a pixelated plate having a plurality of defined pixels for each of a plurality of colors, each of the pixels being configured to allow a corresponding color band to pass therethrough and to reflect light of other color bands;
capturing the reflected light and redirecting the reflected light to the pixelated plate;
imaging the pixelated plate onto a spatial light modulator and
modulating the light with the spatial light modulator that is allowed to pass through each of the pixels on the pixelated plate.

48. The method of claim 47, further comprising the step of reflecting the captured reflected light within the spatial light homogenizer.

49. The method of claim 47, further comprising the step of polarizing the light in the spatial light homogenizer.

50. The method of claim 49, further comprising the step of filtering the polarized light for a defined polarization.

* * * * *

UNITED STATES PATENT AND TRADEMARK OFFICE
CERTIFICATE OF CORRECTION

PATENT NO. : 7,255,448 B2 Page 1 of 1
APPLICATION NO. : 10/969412
DATED : August 14, 2007
INVENTOR(S) : Michael Greer et al.

It is certified that error appears in the above-identified patent and that said Letters Patent is hereby corrected as shown below:

In column 13, line 48, in Claim 15, delete "wobulatlor," and insert -- wobulation --, therefor.

In column 13, line 54, in Claim 16, delete "a" and insert -- at --, therefor.

In column 14, line 54, in Claim 34, after "system" delete "." and insert -- , --, therefor.

In column 14, line 66, in Claim 35, after "34" delete "." and insert -- , --, therefor.

In column 14, line 67, in Claim 35, after "each" insert -- of --.

In column 15, line 17, in Claim 40, after "source" delete ":" and insert -- ; --, therefor.

In column 16, line 26, in Claim 47, after "modulator" insert -- ; --.

Signed and Sealed this

Twelfth Day of August, 2008

JON W. DUDAS
*Director of the United States Patent and Trademark Office*